(12) United States Patent
Enderle et al.

(10) Patent No.: US 6,564,758 B1
(45) Date of Patent: May 20, 2003

(54) METHOD FOR OPERATING AN INTERNAL COMBUSTION ENGINE WITH VARIABLE CHARGE CHANGING CONTROL TIMES

(75) Inventors: Christian Enderle, Baltmannsweiler (DE); Walter Friess, Stuttgart (DE); Jürgen Ganser, Esslingen (DE); Ulrich Letsche, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/913,142

(22) PCT Filed: Jan. 13, 2000

(86) PCT No.: PCT/EP00/00205
§ 371 (c)(1),
(2), (4) Date: Dec. 17, 2001

(87) PCT Pub. No.: WO00/47882
PCT Pub. Date: Aug. 17, 2000

(30) Foreign Application Priority Data

Feb. 10, 1999 (DE) .......................... 199 05 364

(51) Int. Cl.$^7$ ................................ F02B 75/02
(52) U.S. Cl. ................... 123/64; 123/568.14
(58) Field of Search ............... 123/64, 568.14, 123/90.15, 568.11, 562

(56) References Cited

U.S. PATENT DOCUMENTS 5,293,741 A    3/1994   Kashiyama et al.
5,655,508 A    8/1997   Nonaka

FOREIGN PATENT DOCUMENTS

| DE | 1 034 925 | 7/1958 |
|----|-----------|--------|
| DE | 33 17 128 | 11/1984 |
| DE | 195 01 495 | 11/1995 |
| DE | 44 40 920 | 5/1996 |
| DE | 196 31 799 | 1/1997 |
| DE | 42 92 543 | 2/1997 |
| EP | 0 126 812 | 12/1984 |
| EP | 0 703 357 | 3/1996 |
| EP | 0 761 950 | 3/1997 |
| EP | 0 863 301 | 9/1998 |

Primary Examiner—Tony M. Argenbright
Assistant Examiner—Katrina Harris
(74) Attorney, Agent, or Firm—Kenyon & Kenyon

(57) ABSTRACT

A method for operating an internal combustion engine with variable gas exchange control times and with variable control times for the inlet and outlet valves includes, in various operating modes, direct exhaust-gas recirculation by the retarded closing of the outlet valve, exhaust-gas retention by the insertion of a compression and expansion phase with closed gas exchange valves, exhaust-gas filling of the combustion space by the opening of the outlet valve in the gas intake phase, with the inlet valve closed, and/or an apportionment of the combustion action, if appropriate combined with an exhaust emission control measure, to a plurality of working strokes of a working cycle. The various operating modes may be set individually for each combustion space and each working cycle. The method may by used, for example, for gasoline and diesel engines of motor vehicles.

5 Claims, 2 Drawing Sheets ns/minute>
METHOD FOR OPERATING AN INTERNAL COMBUSTION ENGINE WITH VARIABLE CHARGE CHANGING CONTROL TIMES

FIELD OF THE INVENTION

The invention relates to a method for operating an internal combustion engine with variable gas exchange control times, particularly for rapidly reaching the operating temperature during cold starting, for the temporarily intensified generation of hot gas and/or for implementing a multistroke operating mode with an increased number of strokes per working cycle, the latter particularly in order to apportion the combustion process to a plurality of working strokes of a working cycle. The term "gas exchange control times" refers to the control times of the inlet and outlet valves, designated as gas exchange valves, of the combustion space or combustion spaces of the internal combustion engine.

BACKGROUND INFORMATION

The development of freely activatable gas exchange valves, i.e., of inlet and outlet valves, which can be placed into their open or closed position at variably predeterminable points in time during the various working strokes, as described, for example, in German Published Patent Application No. 195 01 495, has made it possible, for the purpose of achieving specific desired effects, to set unconventional gas exchange control times differing from those which are normally used during customary two-stroke or four-stroke operation.

One problem which can be tackled by this technique of variable gas exchange control times is that of reaching the operating temperature as rapidly as possible during a cold start, in order to keep the exhaust-gas emissions as low as possible during the warming-up phase and/or to make it possible, for use in the vehicle engine, to make a sufficient quantity of heat available for heating the vehicle. This is based on the notion, when the internal combustion engine is cold, of not converting the energy contained in the fuel into drive energy in an uncompromisingly optimum manner, but, instead, in particular periods of time, such as after a cold start, also to use it deliberately for heat generation, in order to make corresponding accessories, such as stationary heating appliances, superfluous. This should, of course, be accompanied by exhaust-gas emissions which are as low as possible.

A further requirement during the operation of many internal combustion engines is a temporarily intensified generation of hot gas, for example for the turbine of a coupled exhaust-gas turbocharger. In this application, it is, for example, expedient to improve the transient behavior of turbocharged engines, i.e., engines with an exhaust-gas turbocharger, at the transition from the part-load to the full-load operating mode, this transient behavior being designated as a so-called "turbohole" and being relatively poor, as compared with aspirating engines.

German Published Patent Application No. 1 034 925 describes a method for operating a piston internal combustion engine with an exhaust-gas turbine, in which it becomes possible to set variable gas exchange control times by an adjusting control which makes it possible, by an associated lever being actuated, to vary the angular position of a camshaft in relation to a crankshaft. When, starting from an instantaneous operating state, the drive power supplied by the internal combustion engine on an output shaft is to be reduced, an advanced adjustment of the outlet valves is performed by the adjusting control, in order to continue to feed essentially the same energy to the exhaust-gas turbine, so that it can be maintained in an operating range with high efficiency. In this internal combustion engine, the exhaust-gas turbine can be coupled to its output shaft serving, for example, for driving a motor vehicle or, together with a corresponding supercharger part, can form an exhaust-gas turbocharger. In both cases, there may be provision, particularly in the low rotational speed range, by the advanced adjustment of the outlet valves to feed a large amount of energy to the exhaust-gas turbine, so that the latter can generate a relatively high torque.

In order to achieve a part-load operating mode which is beneficial in terms of fuel consumption, the technique of so-called cylinder cut-off or fade-out is conventional, in which, in a predeterminable part of the successive working cycles, some of the plurality of combustion spaces of a multicylinder internal combustion engine are deliberately "cut out" or "faded out", in that, contrary to normal operation, no fuel injection occurs, so that the cut-off cylinders merely "follow" passively. This arrangement is accompanied by suitable activation measures for the gas exchange valves. Operating methods of this type are described in German Published Patent Application No. 44 40 920, European Published Patent Application No. 0 703 357, German Published Patent Application No. 42 92 543 and U.S. Pat. No. 5,655,508.

It is an object of the present invention to provide an operating method, by which, utilizing the possibility for setting variable gas exchange control times, an internal combustion engine may be operated relatively favorably in terms of consumption and with low pollutant emission, precisely even in special operating situations, such as for warming up and for the intensified generation of hot gas.

SUMMARY

The above and other beneficial objects of the present invention are achieved by providing an operating method as described herein. The operating modes may be provided in corresponding operating situations for one and the same internal combustion engine, the possibility of having the capability of setting variable gas exchange control times being utilized. It is also possible, in any given internal combustion engine, to implement only one of these various operating modes, e.g., in combination with a conventional two-stroke or four-stroke operating mode, or to permit any desired choice of these operating modes for the internal combustion engine.

The method according to the present invention includes a direct exhaust-gas recirculation operating mode, in which a retarded adjustment of the outlet valve or outlet valves is performed, i.e., as compared with normal operation in which the outlet valve is opened only during a gas expulsion phase, it is closed, with a delay, only during a gas intake phase following the gas expulsion phase. As in all other operating modes according to the present invention, this arrangement may occur in each working cycle or only for a selectable part of the successive working cycles of one or more selectable combustion spaces, i.e., the respective operating mode may be set individually for each combustion space and each working cycle according to a predeterminable combustion-space and/or working-cycle pattern. As a result of this arrangement, part of the previously expelled hot exhaust gas is sucked directly back into the combustion space again. The hot exhaust-gas fraction heats the fresh-air quantity subsequently fed via the inlet valve, so that, overall, the discharge of heat to the combustion space walls increases. This operating mode is therefore particularly suitable, for example, for reaching the operating temperature more rapidly during a cold start.

In the direct exhaust-gas recirculation operating mode, the respective inlet valve may be opened, delayed by about the same delay time as the outlet valve in relation to normal operation, i.e., the opening action for the inlet valve then alternates in the conventional manner with the closing action for the outlet valve. This arrangement avoids an appreciable exchange of gas between the intake tract and the exhaust tract.

In the direct exhaust-gas recirculation operating mode, advanced adjustment of the outlet valve may be additionally provided, i.e., the outlet valve is not only closed later than normal, but is also opened earlier than normal, i.e., even before the commencement of the gas expulsion phase during a preceding combustion and expansion phase. The effect of this arrangement is that hot exhaust gas which is still under pressure expands into the outlet tract, so that less energy is converted into mechanical work, and therefore additional exhaust-gas heat occurs, which may be utilized in order to reach the operating temperature more rapidly. Moreover, if required, a still relatively energy-rich or enthalpy-rich hot gas may be provided by the early opening of the outlet valve, in order to bring about an increased power output during a following expansion process, for example, at an exhaust-gas turbine of a turbocharger.

The method according to the present invention may include an exhaust-gas holding operating mode, in which, for at least part of the successive working cycles, the outlet valve is not opened in the usual manner after a combustion and expansion phase, but, instead, is kept closed during a subsequent compression phase and is opened only in the course of a subsequent expansion phase or at the end of the latter and, consequently, at the commencement of a subsequent gas expulsion phase. This insertion of an additional compression and expansion phase increases the number of strokes of the working cycle by two strokes, i.e., in a four-stroke engine, six-stroke operation is obtained, and has the result that, as compared with normal operation, the still hot exhaust gas dwells correspondingly longer in the combustion space and therefore more time is available for the transmission of heat to the combustion space walls. This operating mode is also consequently suitable for rapidly reaching the operating temperature for the internal combustion engine itself and, if appropriate, for a connected exhaust emission control system and, especially in motor vehicle applications, also for the increased provision of heat for heating a vehicle interior. In this exhaust-gas holding operating mode, the energy of the burnt fuel is not converted into mechanical drive energy in an uncompromisingly optimum manner, but is utilized for deliberately providing exhaust-gas heat favorably in terms of consumption and with low pollutant emission.

The operating method according to the present invention may include an exhaust-gas filling operating mode, in which, for at least part of the successive working cycles, the outlet valve is not closed at the end of a gas expulsion phase, but is kept open beyond the subsequent gas intake phase, and at the same time the inlet valve also remains closed in the gas intake phase. The combustion space is thereby filled solely with exhaust gas in this gas intake phase. Subsequently, a compression and expansion phase, with gas exchange valves kept closed and with ignition and fuel injection remaining deactivated, is inserted. The energy necessary in this period of time for this follow-up of the cylinder must be applied in another manner, for example, by other cylinders fired in the same period of time with a higher load than is conventional. In this case, increased wall heat transmission may occur in these cylinders operated with a higher load. The compression energy occurring in the compression phase during exhaust-gas compression may be partially discharged to the combustion space wall and partially converted into gas pressure. By the early opening of the outlet valve even during the expansion phase, some of the gas pressure may be converted into increased exhaust-gas heat, instead of into mechanical drive work. This exhaust-gas filling operating mode is therefore also suitable for the effective provision of heat, particularly also during the warm-up of the internal combustion engine.

The method according to the present invention may include an additional-stroke operating mode, in which the combustion process is apportioned to a plurality of strokes of the corresponding working cycle and/or an additional exhaust emission control working stroke is inserted, for which purpose the working cycle contains corresponding additional working strokes. Thus, between two gas intake phases with a fully open inlet valve, for example, two combustion and expansion phases with a preceding compression phase may be provided, in which the gas exchange valves in each case remain closed and the mixture located in the combustion space is ignited. Individual fuel injection into the combustion space for each of these combustion and expansion phases may be performed, as required. In particular, two directly successive combustion and expansion phases, in each case with an associated compression phase, may be provided within one working cycle. As a further possibility, an exhaust emission control measure, for example, the addition of reducing agent which reduces nitrogen oxides, may be provided in an additional working stroke.

DETAILED DESCRIPTION

FIGS. 1 to 5 illustrate various operating modes of a four-stroke piston internal combustion engine, in each case in the form of a diagram which qualitatively reproduces for a combustion space the profile of the stroke of the gas exchange valves, i.e., of the inlet and of the outlet valve, and the piston stroke, in each case as a function of the crankshaft angle, for one working cycle. Thus, the dashed and dotted characteristic curve 1 illustrates in each case the stroke profile of the piston which moves in the conventional manner between a bottom dead center UT and a top dead center OT. In terms of four-stroke operation, the situation at the top dead center OT differs according to whether a gas exchange is just occurring, designated as GW-OT in the diagrams, or compression is just occurring, designated by VD-OT in the diagrams. For simplicity, in the diagrams, the piston stroke positions of the bottom dead centers UT and of the top dead centers GW-OT, VD-OT are equated with the corresponding crank angle values on the abscissa. In the diagrams, the valve stroke is plotted along the left ordinate in the direction of increasing opening, i.e., the valve stroke value level with the abscissa corresponds to a closed valve, while the upper plateau value of the various characteristic curves of the gas exchange valves represents the fully open position of the respective valve.

Figure 1:
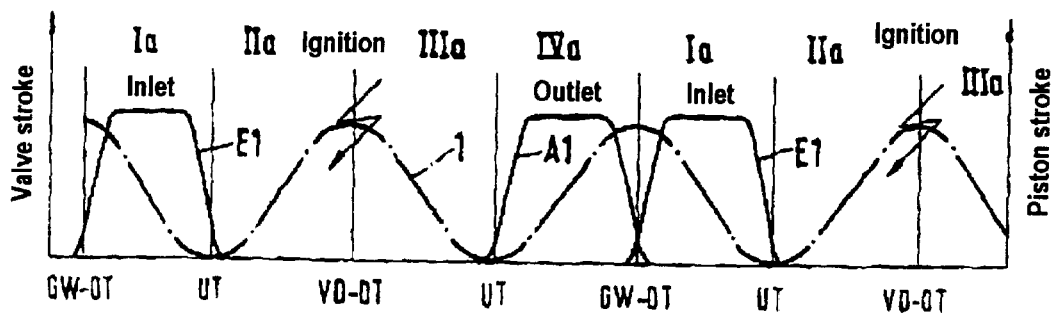
FIG. 1 is a valve-stroke/piston-stroke working-cycle diagram illustrating a normal operating mode of a four-stroke piston internal combustion engine.

FIG. 1 illustrates the normal conventional four-stroke operating mode. In a first working stroke Ia, which forms a gas intake phase, in which the piston moves from the top gas exchange dead center GW-OT to the bottom dead center UT, the inlet valve is opened, as represented by an associated characteristic curve E1. The outlet valve is closed during this time. A subsequent second working stroke IIa forms a compression phase, in which the piston moves from the bottom dead center UT to the top compression dead center VD-OT and the gas exchange valves remain closed. This is followed, as a third working stroke IIIa, by a combustion and expansion phase, in which the piston moves from the top compression dead center VD-OT to the bottom dead center UT and the ignition of the air/fuel mixture formed in the combustion space and also the expansion of the combustion gas formed occur. In this situation, the fuel, after being injected into the intake tract, may pass in the conventional manner, together with the fresh air, into the combustion space or may be injected directly into the combustion space, mostly during the compression phase IIa. The subsequent fourth working stroke IVa forms a gas expulsion phase, in which, with the inlet valve closed, the outlet valve is opened, as represented by the associated characteristic curve A1, with the result that the combustion gas is expelled into the exhaust tract. This concludes a four-stroke working cycle which is followed by the next working cycle.

Figure 2:
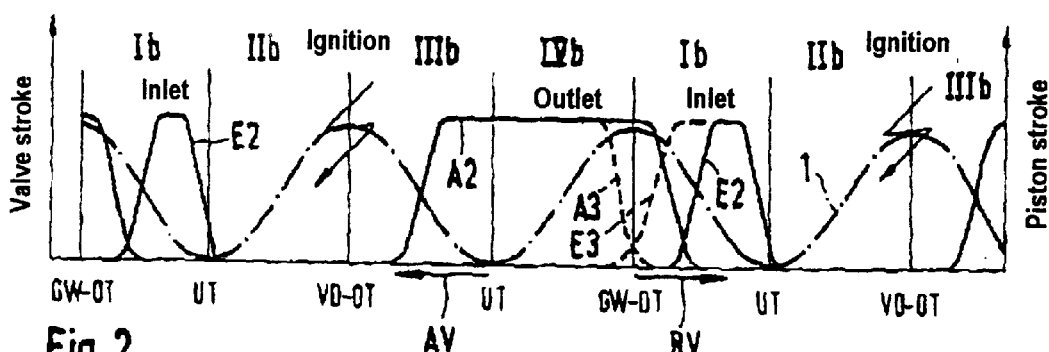
FIG. 2 is a valve-stroke/piston-stroke working-cycle diagram illustrating an example of a direct exhaust-gas recirculation operating mode.

The diagram of FIG. 2 illustrates a direct exhaust-gas recirculation operating mode, in which part of the combustion gas expelled into the exhaust outlet tract via the outlet valve is sucked directly back into the combustion space again, still in the same working cycle, and moreover, hot combustion gas is expanded by the early opening of the outlet valve. The result of the two measures is that the energy provided by fuel combustion is not converted into mechanical drive energy in an optimum manner, but is utilized partially for heat generation, for example, in order to reach the operating temperature of the internal combustion engine more rapidly during cold starting.

For this purpose, the mixture located in the combustion space is compressed in a compression phase IIb which corresponds, unchanged, to that of normal operation, illustrated in FIG. 1, this being followed by a combustion and expansion phase IIIb, during which the outlet valve is already opened early, for example, even after half the combustion and expansion phase, as reproduced by an associated characteristic curve A2. As a result of the early opening of the outlet valve, even before the piston has reached the bottom dead center UT, hot combustion gas which is still under pressure is expanded into the exhaust outlet tract, so that less mechanical work is fed to the piston. The energy not utilized mechanically occurs as additional exhaust-gas heat. The outlet valve remains open during a subsequent gas expulsion phase Ivb and is closed only in the course of a following gas intake phase Ib, i.e., only by a predeterminable return delay value RV after the top gas exchange dead center GW-OT. The inlet valve is opened, delayed, for example, by the same value RV, only in the course of the gas intake phase Ib, as represented by an associated characteristic curve E2. Due to the late closing of the outlet valve, only after the piston has passed the top gas exchange dead center GW-OT and is in the suction phase, is part of the still hot exhaust gas just expelled sucked out of the exhaust outlet tract directly back into the combustion space again. This hot exhaust-gas fraction heats the fresh-air quantity fed as a result of the subsequent opening of the inlet valve, so that the heat which, overall, is discharged during the working cycle to the combustion space walls and therefore to a coolant cooling these increases. In vehicle applications, the warming-up phase of the internal combustion engine, reduced as a result, has the desirable effect that heat for heating a vehicle interior is available relatively quickly via the engine coolant. This result is important particularly in modern engines which are optimized in terms of high efficiency to an extent such that the heat quantity available for vehicle heating is often felt to be too small in the part-load mode. Furthermore, the increased generation of exhaust-gas heat, without the simultaneous generation of an unnecessarily high mechanical drive power, is advantageous for the situation where there is an exhaust emission control system downstream of the internal combustion engine, since this system reaches more rapidly its operating temperature necessary for effective pollutant reduction.

Alternatively to the combination, illustrated in FIG. 2, of early opening and late closing of the outlet valve, it is possible to provide only one of these two measures. The variant in which there is only early opening of the outlet valve which then, as in normal operation illustrated in FIG. 1, is closed, in parallel with the opening of the inlet valve, at the top gas exchange dead center GW-OT, is illustrated in FIG. 2 by dashed outlet-valve and inlet-valve characteristic curves A3, E3. In the other variant, the outlet valve is opened, as is normal, only in the bottom dead center position UT of the piston at the end of the combustion and expansion phase IIIb.

Moreover, the early opening of the outlet valve may be utilized for a temporarily intensified generation of hot gas in situations where the internal combustion engine is followed on the exhaust-gas side by a hot-gas expansion process, for example, in the form of an exhaust-gas turbine of an exhaust-gas turbocharger. In the case of a short-term power requirement by such a hot-gas expansion machine, the internal combustion engine may for a particular period of time be operated to an increased extent as a hot-gas generator by the early opening of the outlet valve, even during the combustion and expansion phase IIIb, at the expense of the delivery of mechanical energy. The internal combustion engine may then be operated conventionally, i.e., in the manner optimized in terms of the generation of mechanical power. An exhaust-gas turbine functioning as a hot-gas expansion machine may also be coupled to an electrical generator instead of to a gas compressor, as in the case of an exhaust-gas turbocharger. By virtue of the early opening of the outlet valve, hot combustion gas which is under pressure and is still relatively energy-rich or enthalpy-rich is expanded into the exhaust outlet tract and may have the effect of a higher power output in the following expansion process. In the exhaust-gas turbocharger application, by this measure, it is possible, in particular, largely to avoid the transient behavior of turbocharged engines, i.e., the so-called turbohole, this transient behavior being poorer than in the aspirating engines, in that, at the transition from the part-load to the full-load mode, the internal combustion engine is temporarily run in this operating mode with an early opening of the outlet valve and an increase in the enthalpy of the exhaust gas is thereby generated upstream of the exhaust-gas turbine.

Figure 3:
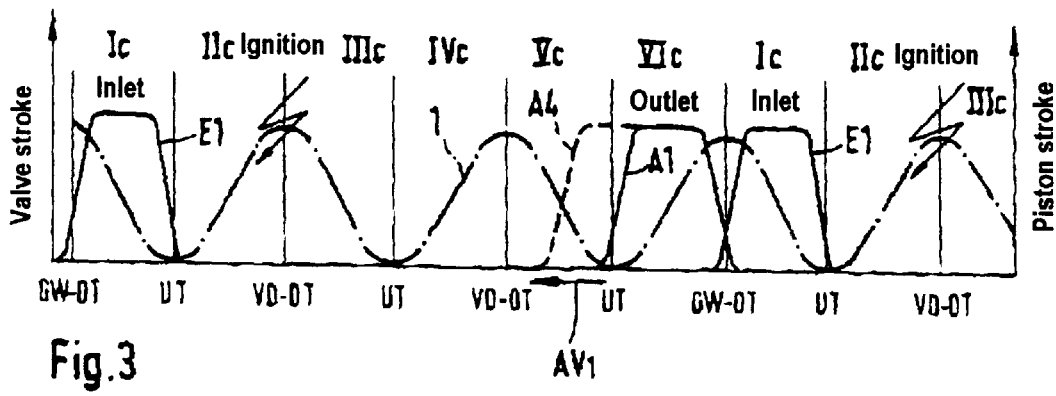
FIG. 3 is a valve-stroke/piston-stroke working-cycle diagram illustrating an example of an exhaust-gas holding operating mode.

The diagram of FIG. 3 illustrates an exhaust-gas holding operating mode, in which the four-stroke internal combustion engine is run in a six-stroke mode by the insertion of two additional working strokes for the purpose of increasing the dwell time of the hot combustion gas in the combustion space. The first three working strokes in the form of a gas intake phase Ic, a compression phase IIc and a combustion and expansion phase IIIc correspond to those of normal operation illustrated in FIG. 1. After these, however, the outlet valve in this case remains closed in a fourth working stroke IVc, with the result that the hot exhaust gas located in the combustion space is compressed once again in a compression phase. In a subsequent expansion phase Vc, which forms a fifth working stroke, the exhaust gas is then expanded again. A subsequent sixth working stroke IVc then forms a gas expulsion phase, with the outlet valve open, corresponding to the fourth working stroke IVa of normal operation illustrated in FIG. 1. Alternatively, the outlet valve may be opened, even during the expansion phase Vc, by a predeterminable expulsion advance value AV1 before the commencement of the gas expulsion phase VIc, see the associated dashed outlet-valve characteristic curve A4. In this case, the hot combustion gas which is still under pressure, in turn, converts its energy to a lesser extent into mechanical piston work than into exhaust-gas heat, which may be utilized for the more rapid heating of the internal combustion engine and/or of a downstream exhaust emission control system.

What is achieved by the insertion of the two additional compression and expansion phases IVc, Vc is that the still hot exhaust gas dwells in the combustion space approximately three times longer than in normal operation illustrated in FIG. 1, so that correspondingly more time is available for the transmission of heat from the exhaust gas into the combustion space walls, and this may be utilized for the more rapid heating of the internal combustion engine and/or for the increased provision of heat for vehicle heating.

Figure 4:
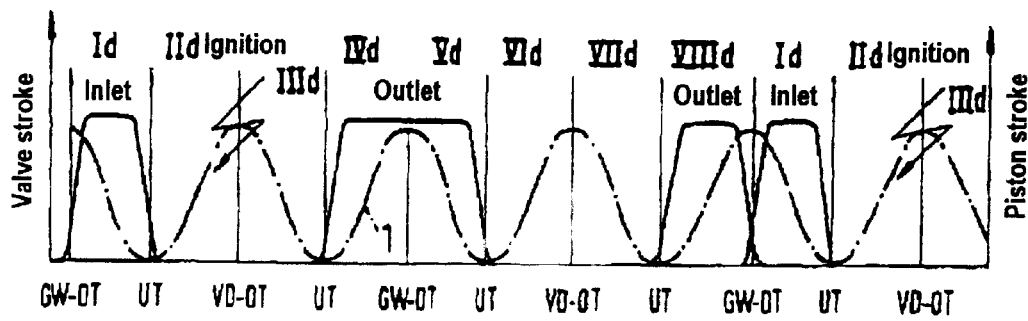
FIG. 4 is a valve-stroke/piston-stroke working-cycle diagram illustrating an example of an exhaust-gas filling operating mode.

The diagram of FIG. 4 illustrates an exhaust-gas filling operating mode, in which temporarily, with a resulting doubling of the number of strokes per working cycle, the combustion space is filled solely with exhaust gas, instead of at least partially with fresh air. In this respect, the first three working strokes in the form of a gas intake phase Id, a compression phase IId and a combustion and expansion phase IIId initially correspond to those of normal operation illustrated in FIG. 1. A subsequent gas expulsion phase IVd as a fourth working stroke also corresponds to that of normal operation, with the exception that, at the end of this gas expulsion phase IVd, the outlet valve is not closed, but is still kept open until the end of a subsequent gas intake phase as a fifth working stroke Vd, the inlet valve remaining closed during this gas intake phase Vd, in contrast to normal operation. Thus, in this gas intake phase Vd, only exhaust gas is sucked into the combustion space. Two subsequent working strokes VId, VIId form a compression phase and an expansion phase, in which the returned exhaust gas is compressed and expanded again. The energy necessary for this purpose must be applied in another manner, for example, by other engine cylinders being simultaneously operated with an increased load. In this case, in addition, the effect of the transmission of heat into the combustion space wall rises for the cylinders to be operated with the increased load. The compression energy occurring during the compression of the exhaust gas may partially flow as heat into the still cold combustion space wall, particularly in the warming-up phase, its other part being converted into gas pressure. An eighth working stroke VIIId forms a gas expulsion phase corresponding to the fourth working stroke IVa of normal operation illustrated in FIG. 1. If required, an advanced opening of the outlet valve before the end of the preceding expansion phase VIId may be provided, in order to convert the gas pressure into increased exhaust-gas heat instead of into mechanical piston work.

Figure 5:
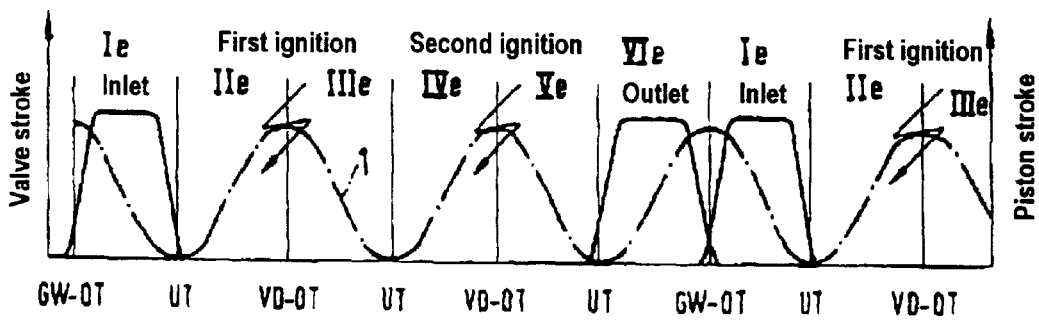
FIG. 5 is a valve-stroke/piston-stroke working-cycle diagram illustrating an example of an additional stroke operating mode.

The diagram of FIG. 5 illustrates an example of an additional-stroke operating mode, in which the combustion action within a working cycle is apportioned to a plurality of combustion and expansion phases, for which purpose the working cycle contains corresponding additional working strokes. Consequently, for example, solely by a change in the gas exchange control times and in the fuel injection, an internal combustion engine designed on the four-stroke principle may be converted to multistroke operation with more than four strokes per working cycle, without mechanical interventions being necessary for this purpose. The conversion may be stored in the engine control unit, for example as a corresponding program code in software. This also applies, moreover, to the other operating modes according to the present invention.

In the example illustrated in FIG. 5, a four-stroke internal combustion engine is operated in the six-stroke mode, with a first combustion in the third working stroke and a second combustion in the fifth working stroke, without an intermediate gas exchange action. The first three working strokes in the form of a gas intake phase Ie, a compression phase IIe and a combustion and expansion phase IIIe correspond to those of normal operation illustrated in FIG. 1. In this case, combustion in the third working stroke IIIe occurs with air excess. Subsequently, the outlet valve is not opened, as is conventional, but, instead, the outlet and inlet valves are kept closed, so that the subsequent fourth working stroke IVe forms a compression phase, in which the air/exhaust-gas mixture located in the combustion space is compressed again. Toward the end of this compression phase IVe or at the commencement of the following combustion and expansion phase forming a fifth working stroke Ve, a second addition of fuel occurs, after which the combustion and expansion process then occurs. A subsequent sixth working stroke VIe forms a gas expulsion phase corresponding to the fourth working stroke of normal operation illustrated in FIG. 1 and concludes the six-stroke working cycle.

By the six-stroke operation, typically up to about two thirds of the full load of four-stroke operation may be achieved in the part-load range. In this operating mode, the combustion action, with a fresh-air quantity fed once, may be performed as precombustion in the third working stroke IIIe and as main combustion in the fifth working stroke Ve, with the advantage that more time is available for the individual combustion phases and therefore a better and more homogeneous mixture preparation is possible, this result being conducive to the utilization of air and fuel.

Alternatively, the additional-stroke operating mode may be configured so that, in the part-load range, precombustion and main combustion are performed in the third working stroke IIIe and exhaust-gas retreatment is performed in the fourth and/or fifth working stroke IVe, Ve. The latter may occur in the form of afterburning by the further supply of fuel or in the form of pollutant conversion, for example, by the addition of reducing agents for the conversion of nitrogen oxides.

A further alternative is to treat within the engine only a particular part of the mixture contained in the combustion space, in the fourth and fifth working strokes IVe, Ve, but to cause the remaining part to flow out, for example, as a result of the brief opening of the outlet valve at the commencement of the fourth working stroke IVe, in order thereby to perform a reaction downstream of the engine.

As a further alternative, the second phase of the combustion process, for example in the fifth working stroke Ve, may be configured so that only part of the injected fuel quantity is burnt and the remaining part remains unburnt as an excess quantity in prepared form and is flushed out together with the untreated exhaust gas, in order to provide in the exhaust gas, for the purpose of exhaust-gas retreatment, a desired quantity of unburnt hydrocarbons which, for example, may contribute to the reduction of nitrogen oxides downstream of the engine. In addition, by the second combustion phase, along with sufficient homogenization, it is possible for the atmospheric oxygen to be consumed largely within the engine, so that, for example, the brief enriched mode with excess fuel, cyclically necessary for the regeneration of nitrogen-oxide adsorber catalysts, may be implemented in a simple manner. In all the alternatives mentioned, between any two of the processes within the engine, gas exchange actions may be eliminated or, alternatively, a partial gas exchange for the discharge of gas from the combustion space or for the supply of gas into the combustion space may be permitted.

The apportionment of the combustion action to a plurality of working strokes is suitable, in particular, for internal combustion engines with direct injection, in which the points in time and the quantities of fuel metering are freely selectable, at least within particular limits. The actual combustion may be followed and/or preceded by one or more further processes within the engine. Between these processes, gas exchange actions may be eliminated. Alternatively, a partial expulsion of exhaust gas from the combustion space and/or a partial feed of fresh air into the combustion space may occur.

The operating modes described above may be distributed, individually in terms of combustion space and working cycle, to the combustion space or combustion spaces of the internal combustion engine and their successive working cycles, i.e., for each working cycle of each combustion space, the operating mode may be fixed individually by a setting of the corresponding gas exchange control times and, if appropriate, of fuel injection and ignition. Thus, for example, the particularly heat-delivering working cycles may be executed in the individual cylinders more or less frequently, as required. The distribution of the working cycles of a respective operating mode may occur, in particular, according to fixed patterns or in a rolling manner. For example, all the cylinders of the internal combustion engine may be run synchronously, for some of the working cycles, in the normal operating mode illustrated in FIG. 1 and, otherwise, in one of the other operating modes illustrated in FIGS. 2 to 5, or some cylinders may be run in the normal illustrated in FIG. 1 and the other cylinders in one of the other operating modes illustrated in FIGS. 2 to 5 or other method variants according to the present invention. The operating method according to the present invention is suitable both for gasoline engines and for diesel engines.

The operation according to the present invention with variable gas exchange control times may be combined with other advantageous conventional interventions in the operation of the engine, such as an early or late position of the combustion center of gravity or the execution of a plurality of individual or long-lasting combustion actions within a working stroke, for example, by multiple fuel metering during such a working stroke. The operating modes with late closing of the outlet valve, in particular with an early opening of the latter being eliminated, and with exhaust-gas retention may be used, even when the internal combustion engine is running hot, for regulating the load in the lower load range in a manner which is beneficial in terms of consumption.

What is claimed is:

1. A method for operating an internal combustion engine with variable gas exchange control times, selectively in one of at least two different operating modes, the at least two operating modes including a normal operating mode, an exhaust-gas holding operating mode, an exhaust-gas filling operating mode and an additional-stroke operating mode, the method comprising the steps of:

in the exhaust-gas holding operating mode, in accordance with at least one combustion space and at least part of successive working cycles, inserting a compression phase and an expansion phase after a combustion and expansion phase, maintaining an outlet valve closed in the compression phase and opening the outlet valve one of during a subsequent expansion phase and at a commencement of a following gas expulsion phase;

in the exhaust-gas filling operating mode, in accordance with at least one combustion space and at least part of successive working cycles, maintaining an inlet valve closed and the outlet valve open during a gas intake phase, subsequently inserting a compression phase and an expansion phase, maintaining the outlet valve closed in the compression phase and opening the outlet valve one of during the subsequent expansion phase and at a commencement of a following gas expulsion phase; and in the additional-stroke operating mode, in accordance with at least one combustion space and at least part of successive working cycles, performing two compression phases and two expansion phases, a first one of the two compression and expansion phases including a fuel combustion action and a second one of the two compression and expansion phases including one of a fuel combustion action and an exhaust/emission control measure.

2. The method according to claim 1, wherein the at least two operating modes includes a direct exhaust-gas recirculation operating mode, the method further comprising the step of, in the direct exhaust-gas recirculation operating mode, in accordance with at least one combustion space and at least part of successive working cycles, closing the outlet valve, delayed by a predeterminable return delay value, only during a gas intake phase following a gas expulsion phase.

3. The method according to claim 2, wherein during the gas intake phase, the inlet valve is only opened, delayed by the return delay value.

4. The method according to claim 2, wherein the outlet valve is opened early by a predeterminable expulsion advance value before the commencement of the gas expulsion phase.

5. The method according to claim 4, wherein the outlet valve is opened early during a preceding combustion and expansion phase.

* * * * *